(12) United States Patent
Teixeira (10) Patent No.: US 10,377,171 B2
(45) Date of Patent: Aug. 13, 2019

(54) TUBELESS BICYCLE WHEEL BEAD LOCK

(71) Applicant: Specialized Bicycle Components, Inc., Morgan Hill, CA (US)

(72) Inventor: Chuck Teixeira, Bonny Doon, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 0 days.

(21) Appl. No.: 15/887,550

(22) Filed: Feb. 2, 2018

(65) Prior Publication Data

US 2018/0154688 A1 Jun. 7, 2018

Related U.S. Application Data

(63) Continuation of application No. 14/737,548, filed on Jun. 12, 2015, now abandoned.

(Continued)

(51) Int. Cl.
*B60B 21/12* (2006.01)
*B60C 29/02* (2006.01)
(Continued)

(52) U.S. Cl.
CPC .......... *B60B 21/125* (2013.01); *B60C 15/028* (2013.01); *B60C 15/0213* (2013.01);
(Continued)

(58) Field of Classification Search
CPC ....... B60B 21/12; B60B 21/125; B60C 15/02; B60C 15/0209
See application file for complete search history.

(56) References Cited

U.S. PATENT DOCUMENTS

| 548,926 A | 10/1895 | Phelps |
| 2,324,994 A | 7/1943 | Hale |

(Continued)

FOREIGN PATENT DOCUMENTS

| CN | 102991268 | 3/2013 |
| EP | 2261065 | 3/2013 |
| WO | 2007087970 | 8/2007 |

OTHER PUBLICATIONS

EP15171827.7 Extended European Search Report dated Oct. 21, 2015 (6 pages).

(Continued)

*Primary Examiner* — Jason R Bellinger
(74) *Attorney, Agent, or Firm* — Michael Best & Friedrich LLP (57) ABSTRACT

A vehicle wheel including a wheel rim having first and second sidewalls defining a rim trough and an opening extending through a portion of the wheel rim, a tire having a tire bead positioned in the rim trough in engagement with the first sidewall, and a bead lock positioned in the rim trough adjacent the tire bead. The bead lock is movable between a locked position and an unlocked position. The bead lock includes an actuator positioned in the opening with a portion accessible from outside the rim, and a hand positioned in the rim trough with two free ends moveable relative to each other and a side edge engaged with the tire bead. The side edge includes a cut out that creates a recessed edge that is not engaged with the tire bead.

12 Claims, 10 Drawing Sheets

Related U.S. Application Data (60) Provisional application No. 62/011,384, filed on Jun. 12, 2014.

(51) Int. Cl.
  *B60C 15/02* (2006.01)
  *B60C 15/028* (2006.01)

(52) U.S. Cl.
  CPC ........ *B60C 29/02* (2013.01); *B60B 2900/523* (2013.01); *B60C 2200/12* (2013.01); *B60Y 2200/13* (2013.01)

(56) References Cited

U.S. PATENT DOCUMENTS

| | | | |
|---|---|---|---|
| 2,393,494 A | 1/1946 | Hale | |
| 2,440,740 A | 5/1948 | Daddio | |
| 3,948,305 A | 4/1976 | Watts | |
| 4,159,730 A | 7/1979 | Osda et al. | |
| 4,776,377 A | 10/1988 | Susini et al. | |
| 4,797,987 A | 1/1989 | Bush | |
| 5,000,240 A | 3/1991 | Jones, Jr. | |
| 5,000,241 A | 3/1991 | Patecell | |
| 5,271,443 A | 12/1993 | Boni et al. | |
| 5,355,923 A | 10/1994 | Boni et al. | |
| 6,679,306 B2 | 1/2004 | Steinke | |
| 6,843,287 B2 | 1/2005 | Seko et al. | |
| 7,040,365 B2 | 5/2006 | Lust | |
| 8,118,072 B2 | 2/2012 | Khatib | |
| 8,196,629 B2 | 6/2012 | Gardetto | |
| 2006/0096684 A1 | 5/2006 | Heuze et al. | |
| 2015/0360511 A1* | 12/2015 | Teixeira | B60B 21/125 152/544 |

OTHER PUBLICATIONS

Taiwan Patent Office Action and Search Report for Application No. 104119158 dated Dec. 28, 2018 (5 pages, statement of relevance included).

* cited by examiner

TUBELESS BICYCLE WHEEL BEAD LOCK

CROSS-REFERENCE TO RELATED APPLICATIONS

This application is a continuation of U.S. application Ser. No. 14/737,548, filed Jun. 12, 2015, now abandoned, which claims Priority to U.S. Application No. 62/011,384, filed Jun. 12, 2014, The entire contents of each of which are incorporated by reference herein.

BACKGROUND

The present invention relates generally to bicycle wheels, and particularly to a system for locking a tire bead into engagement with a bicycle rim.

Pneumatic bicycle wheels commonly include a hub, spokes extending radially from the hub, a rim secured to the outer ends of the spokes, and a tire mounted on the rim. While many bicycle wheels include an inner tube between the tire and rim for holding pressurized air, some bicycle rims eliminate the inner tube and instead create a sealed chamber between the tire and the rim. In order to create such a "tubeless" wheel, it is important to have an airtight seal between the tire bead and the sidewalls of the rim. In tubeless wheels, the internal air pressure presses and holds the tire bead in engagement with the rim.

In order to create a proper seal in a tubeless wheel, a precise fit is desired between the tire bead and the rim. Some rims use a small lip to keep the tire in place. The standard fit between a tubeless tire and a rim works well under easy riding with medium to high tire pressures. This system, however, will not work well under extreme cornering loads or when tire pressures are low. High cornering loads can cause the tire bead to stretch and lift off of the rim's bead seat and cause air to escape, or completely jump off the rim in extreme conditions. Low tire pressures are often desirable on bicycles for maximum traction and smoother riding experiences. However, such low-pressure tires have been known to lose pressure when the tire bead separates from the rim because there is insufficient air pressure holding the tire bead in place.

SUMMARY

The present invention provides, in one aspect, a vehicle wheel comprising a wheel rim having first and second sidewalls defining a rim trough and an opening extending through a portion of the wheel rim, a tire having a tire bead positioned in the rim trough in engagement with the first sidewall, and a bead lock positioned in the rim trough adjacent the tire bead. The bead lock is movable between a locked position in which the bead lock substantially inhibits movement of the tire bead away from the first sidewall and an unlocked position in which the bead lock permits movement of the tire bead away from the first sidewall. The bead lock includes an actuator positioned in the opening and including a portion accessible from outside the rim. The bead lock further includes a band positioned in the rim trough and including two free ends movable relative to each other. The band has a side edge engaged with the tire bead. The side edge includes a cut out that creates a recessed edge that is not engaged with the tire bead.

The present invention provides, in another aspect, a vehicle wheel adapted to receive a tire having a tire bead. The vehicle wheel includes a wheel rim having first and second sidewalls defining a rim trough and an opening extending through a portion of the wheel rim, and a bead lock positioned in the rim trough adjacent the tire bead. The bead lock is movable between a locked position and an unlocked position. The bead lock includes an actuator capable of moving the bead lock from the unlocked position to the locked position. The actuator is at least partially positioned in the opening and includes a portion accessible from outside the rim. The bead lock further includes a band positioned in the rim trough with two free ends movable relative to each other and a side edge engaged with the tire bead. The side edge includes a cut out that creates a recessed edge that is not engaged with the tire bead.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
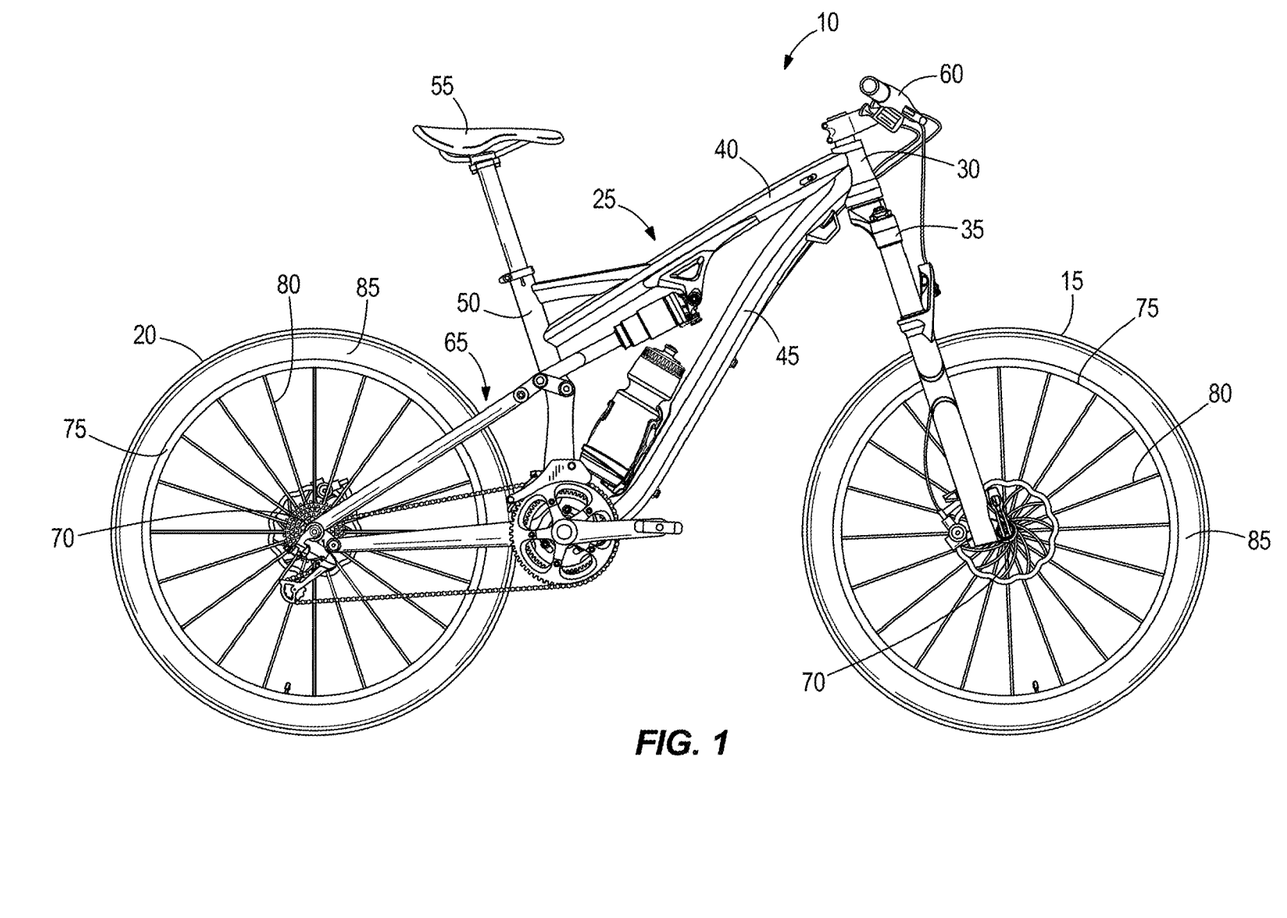
FIG. 1 illustrates a bicycle having wheels embodying the present invention.
Figure 2:
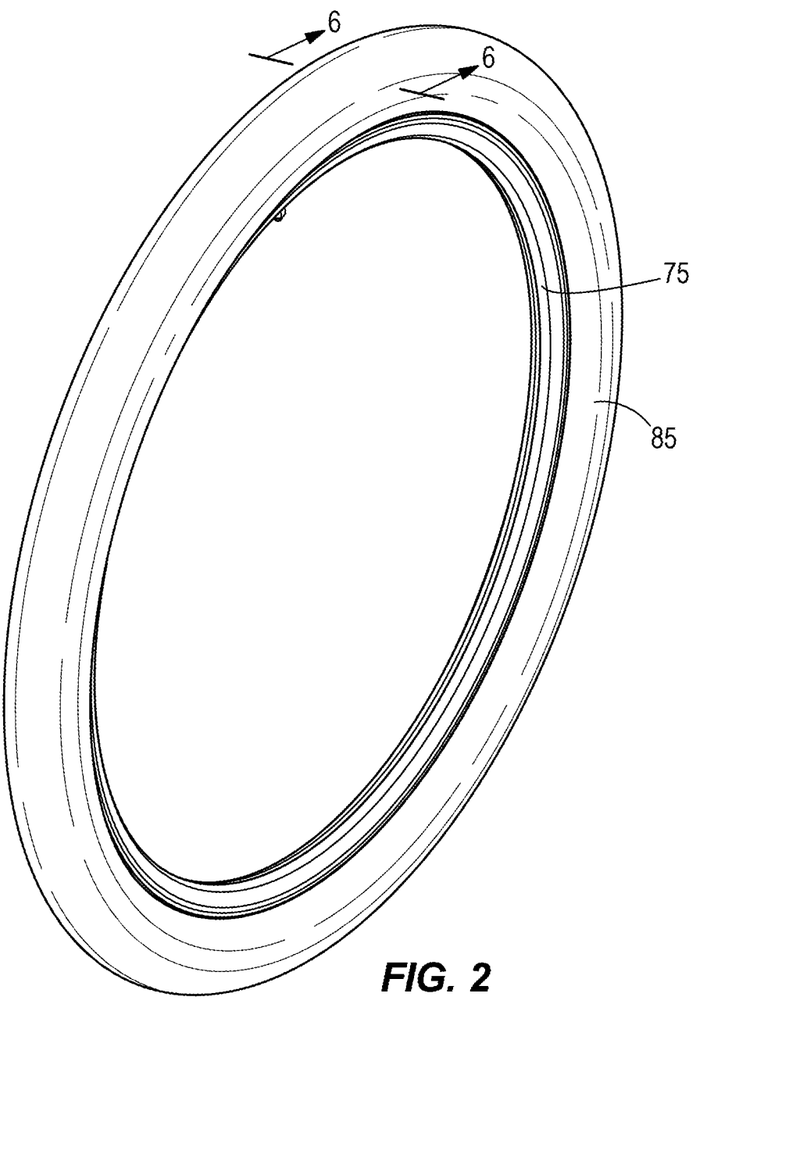
FIG. 2 is a perspective view of the rim and tire of one of the wheels from FIG. 1.
Figure 3:
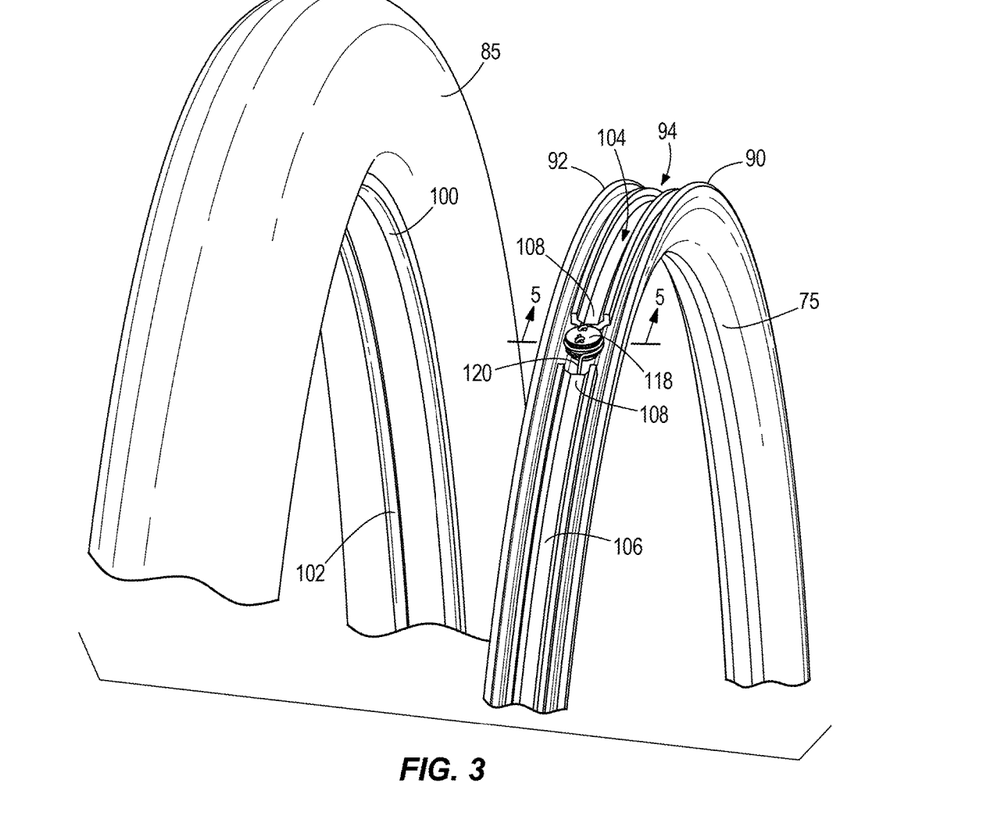
FIG. 3 is a perspective view of the rim and tire of FIG. 2 with the tire exploded off the rim.
Figure 4:
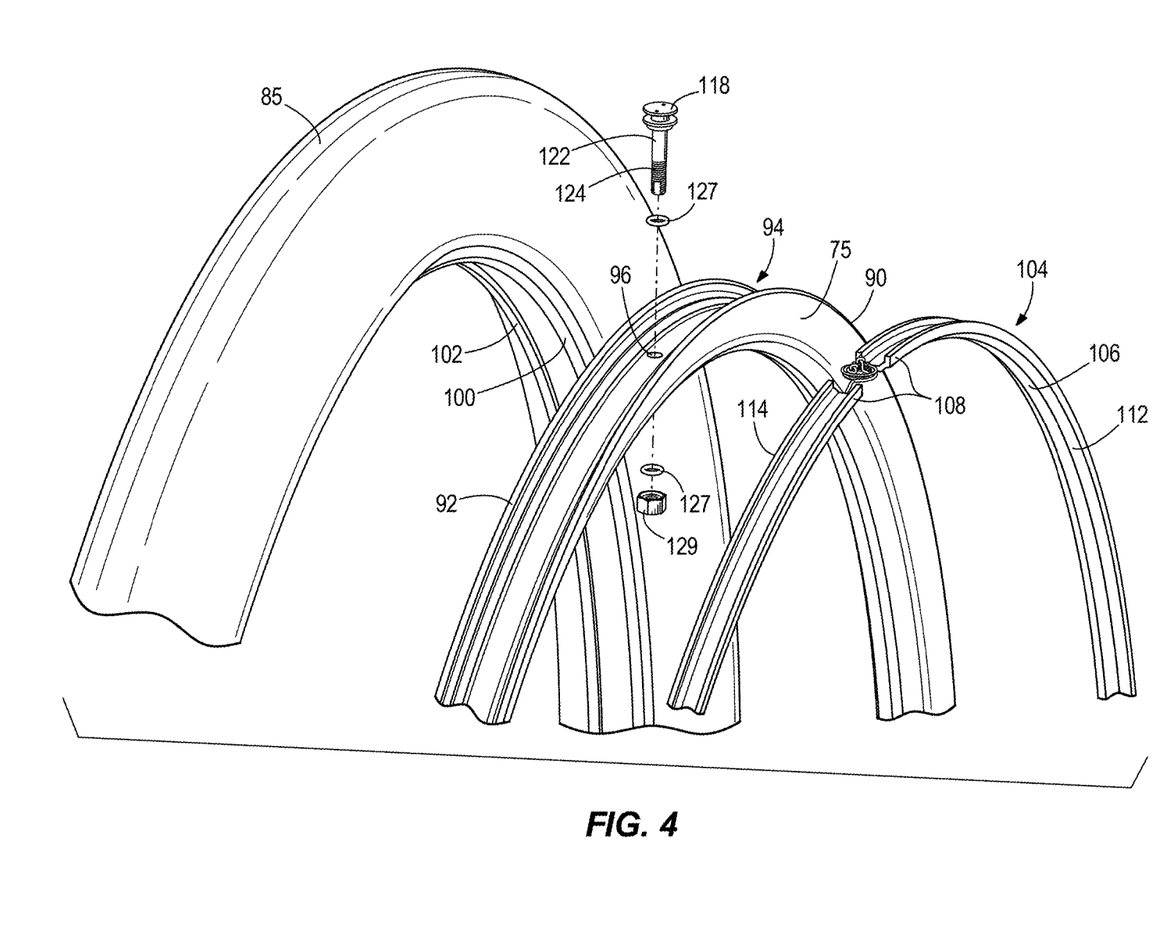
FIG. 4 is an exploded view of the tire and rim of FIG. 3.
Figure 5:
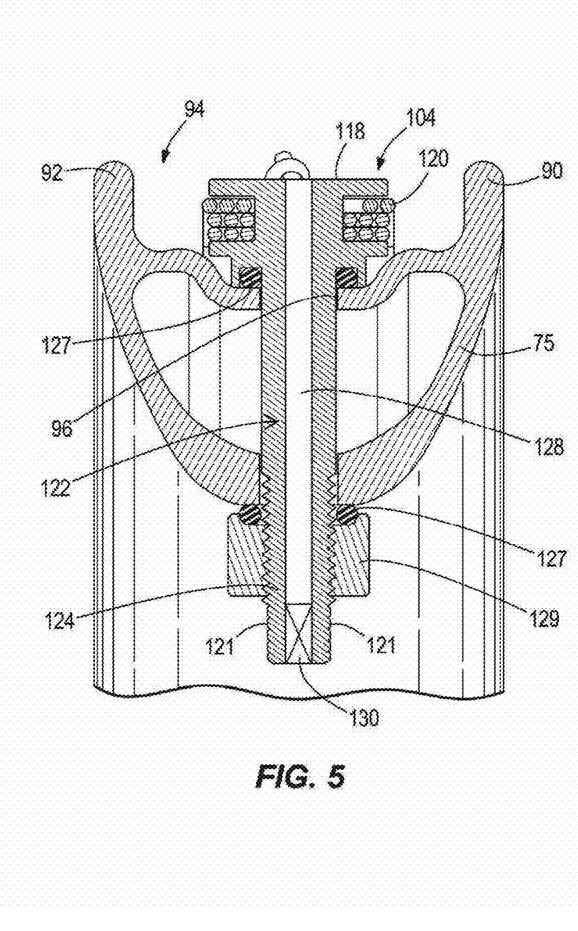
FIG. 5 is a cross section of the wheel taken along line 5-5 in FIG. 3.

FIG. 1 shows a bicycle 10 that includes a front wheel 15, a rear wheel 20, and a frame 25. The frame 25 has a head tube 30, a front fork 35 rotationally supported by the head tube 30, a top tube 40 connected to and extending rearward from the head tube 30, and a down tube 45 connected to the head tube 30 below the top tube 40 and extending generally downward toward a bottom bracket (not shown) of the frame 25. A seat tube 50 extends upward from the bottom bracket and is connected to the top tube 40, and a seat 55 is supported by the seat tube 50. The bicycle 10 also includes a handlebar 60 for turning the front wheel 15 via the fork 35, and a rear frame triangle 65 that supports the rear wheel 20. Each wheel 15, 20 includes a hub 70, a rim 75 supported by the hub 70 via spokes 80 (or other reinforcement members), and a tire 85 that is attached to the rim 75.

FIGS. 2-7 illustrate the rim 75 and tire 85 of the front and rear wheel in more detail. Specifically, the illustrated rim 75 includes first and second sidewalls 90, 92 defining a rim trough 94 and an opening 96 extending through a portion of the wheel rim 75. The tire 85 has first and second tire beads 100,102 positioned in the rim trough 94 in engagement with the first and second sidewalls 90,92, respectively (see, e.g., FIGS. 6 and 7).

Figure 6:
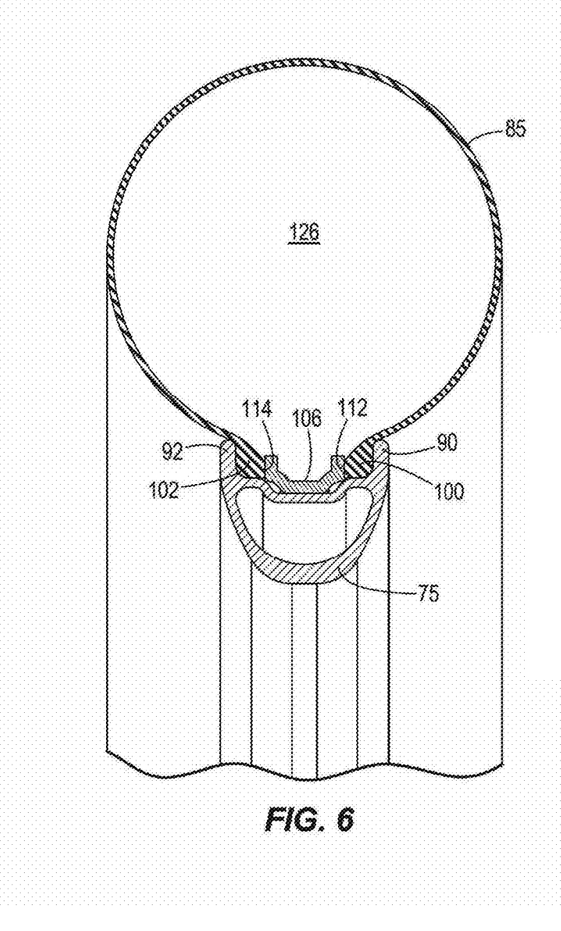
FIG. 6 is a cross section of the wheel taken along line 6-6 in FIG. 2 with a locking mechanism in a locked position.
Figure 7:
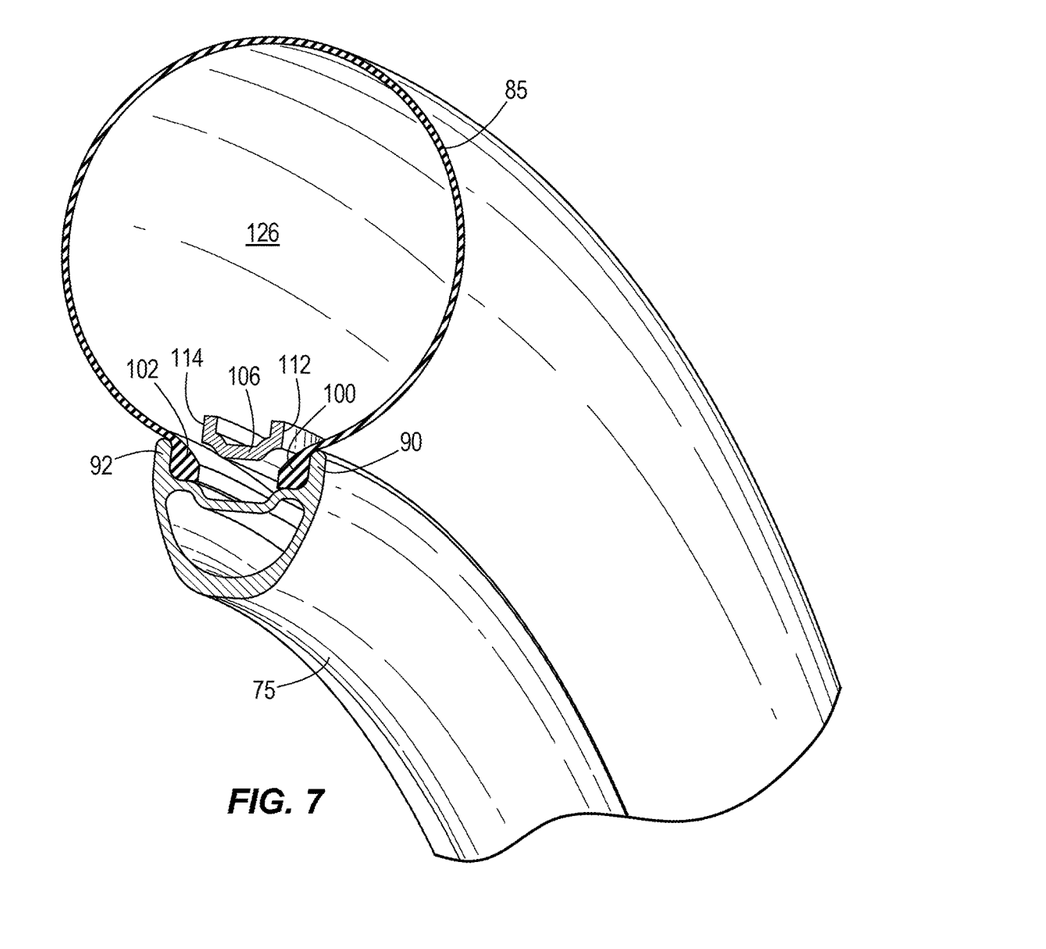
FIG. 7 is the cross section of FIG. 6 in perspective with the locking mechanism in an unlocked position.

The illustrated wheel further includes a bead lock 104 positioned in the rim trough 94 adjacent the tire beads 100,102. The illustrated bead lock 104 includes an open-ended band 106 positioned in the trough 94 and including two free ends 108. The illustrated band 106 is made from a springy material that has memory (e.g., plastic, reinforced plastic, composite, spring steel, etc.) and is movable between a locked position (with the free ends 108 pulled close together) and an unlocked position (with the free ends 108 permitted to spring further apart). The band 106 is configured to have a static (unstressed) shape that is larger in diameter than the diameter of the rim trough 94 so that the band 106 will be biased from the locked position toward the unlock position. In the locked position, the band 106 is nestled into the rim trough 94 and substantially inhibits movement of the tire beads 100,102 away from the sidewalls 90,92. In the unlocked position, the band 106 springs out of the rim trough 94 and permits movement of the tire beads 100,102 away from the sidewalls 90,92. For example, in the illustrated embodiment, the band 106 includes first and second side edges 112,114 that are engageable with the first and second tire beads 100,102, respectively, when the band 106 is in the locked position (FIG. 6). The first and second side edges 112,114 are disengageable with the first and second tire beads 100,102 when the band 106 is in the unlocked position (FIG. 7).

The bead lock 104 further includes a tightening mechanism configured to selectively move the free ends 108 toward each other. The illustrated tightening mechanism includes a winch 118 and two cables 120 wrapped around the winch 118. One end of each cable 120 is secured to one of the free ends 108 of the band 106. The winch 118 is secured to an actuator 122 that is mounted for rotation in the opening 96 of the rim 75. An exposed portion 124 of the actuator 122 extends through the rim 75, has flat sides 121, and is accessible from outside the rim. That is, the flats 121 of the actuator 122 can be engaged (e.g., by a wrench or other appropriate tool) from outside an interior volume 126 defined by the rim 75 and tire 85. Two seals 127 between the actuator 122 and the rim 75 inhibit the passage of gas between the actuator 122 and the rim 75. A nut 129 secures the actuator 122 to the rim 75.

By virtue of this arrangement, the winch 118 can be rotated to tightened the cables 120 and move the band 106 to the locked position to hold the tire beads 100,102 in engagement with the sidewalls 90,92. When it is desired to remove the tire 85 from the rim 75, the winch 118 can be rotated in the opposite direction to loosen the cables 120, which allows the band 106 to spring from the locked position to the unlocked position. This arrangement facilitates movement of the band 106 into the tire when the cables 120 are released, thereby making tire installation and removal easier.

Figure 8:
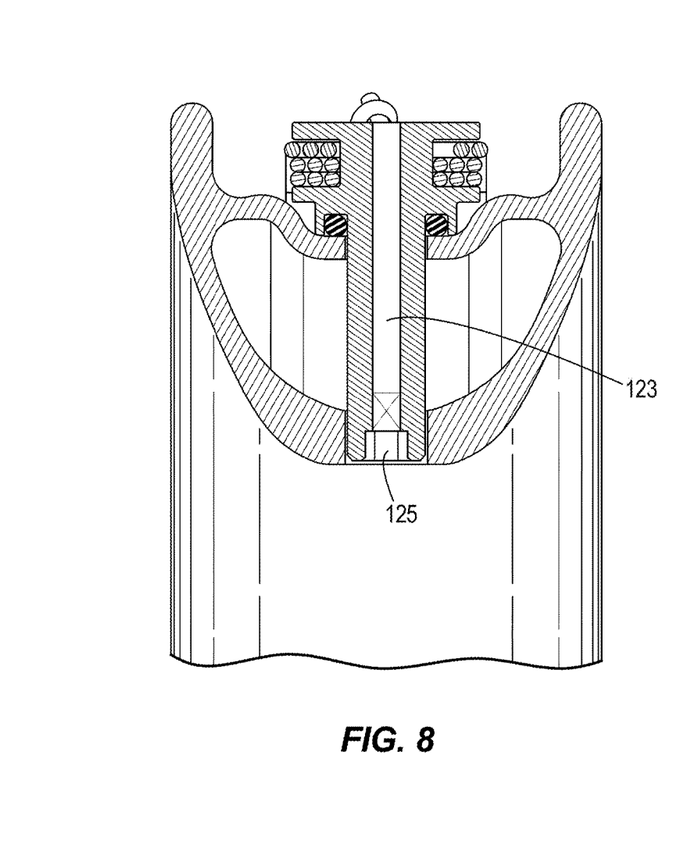
FIG. 8 is a cross section similar to FIG. 5 and showing an alternative recessed arrangement for the locking mechanism.

In an alternative embodiment shown in FIG. 8, the exposed portion of the actuator 123 could be recessed within the rim yet still be accessible. For example, the exposed portion could include a shaft with a hex socket 125 designed to receive an allen wrench for rotating the actuator. In this alternative embodiment, the actuator 123 can be hollow (e.g., to reduce weight and to facilitate insertion of air into the tire), but also require some means for preventing loss of air from the tire, such as a valve mechanism.

The illustrated actuator 122 is made from a tubular member having a hollow interior 128. A valve mechanism 130 is positioned in the hollow interior to control the passage of gas into and out of an interior volume 126. By virtue of this construction, the actuator 122 can be used as a passage for inserting air into the wheel, and the valve mechanism 130 will inhibit escape of pressurized air from the wheel unless manually released.

Figure 9:
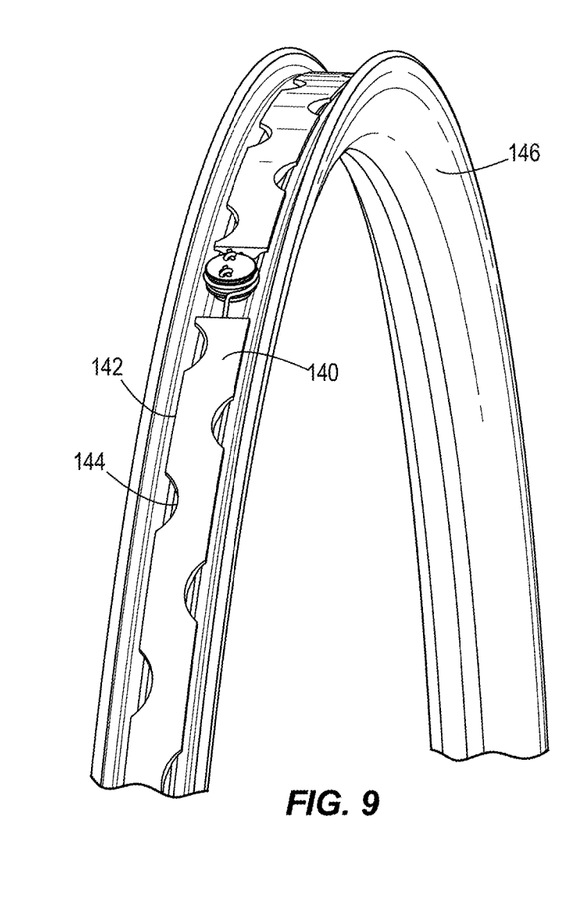
FIG. 9 is a perspective view of a second embodiment of the present invention.
Figure 10:
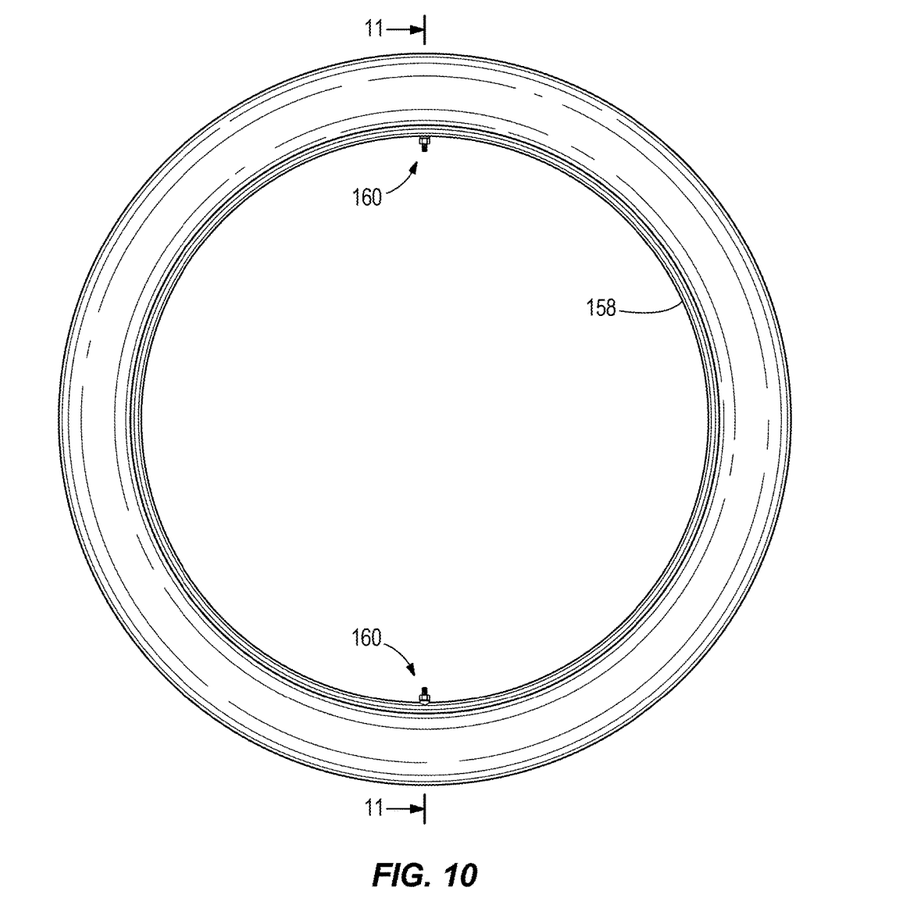
FIG. 10 illustrates a rim and tire that is a third embodiment of the present invention.
Figure 11:
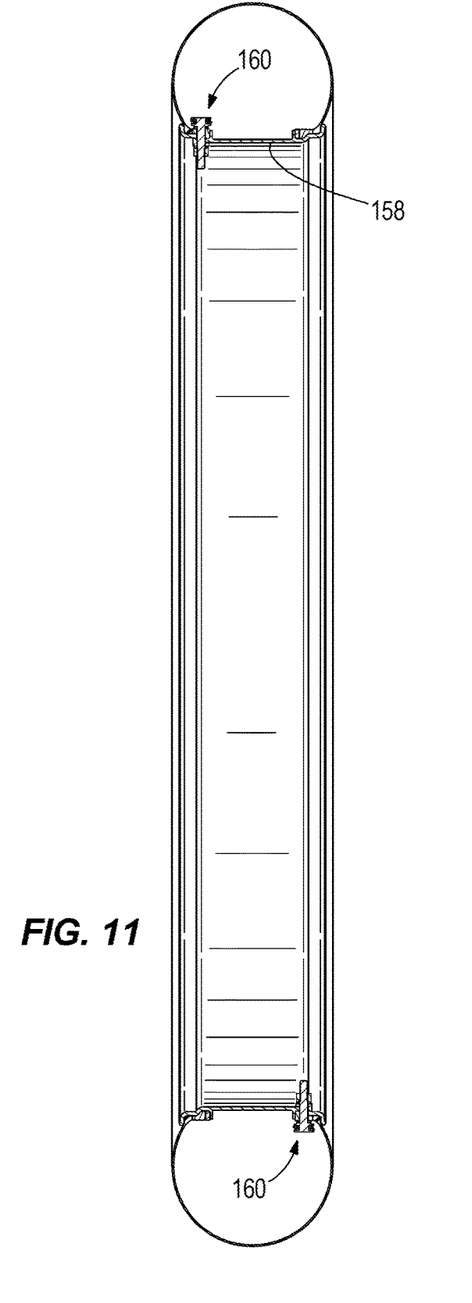
FIG. 11 is a cross section taken along line 11-11 of FIG. 10.
Figure 12:
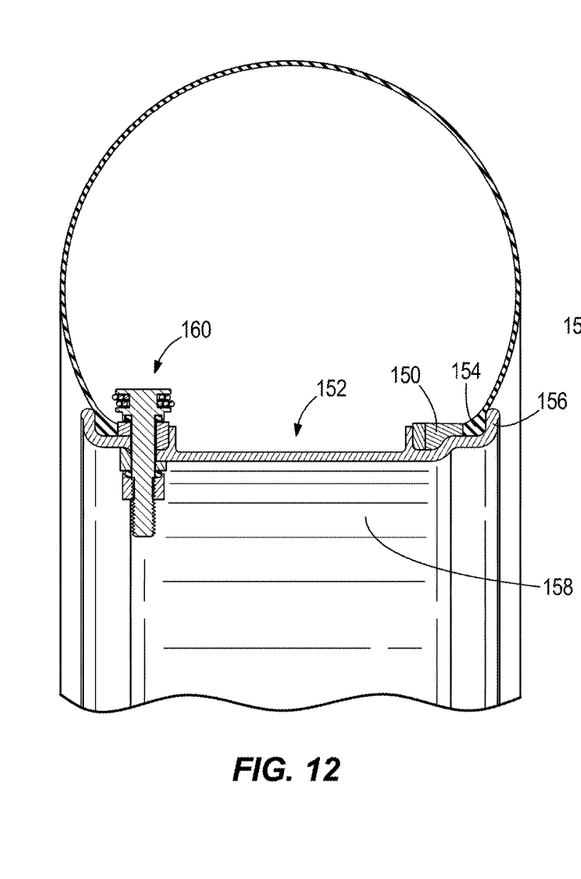
FIG. 12 is an enlarged view of the upper part of FIG. 11.
Figure 13:
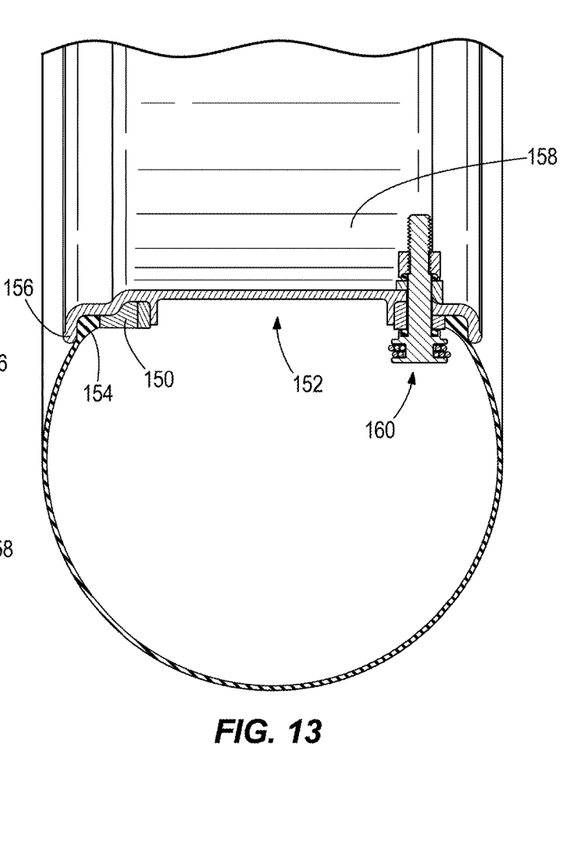
FIG. 13 is an enlarged of the lower part of FIG. 11.

A second embodiment of the invention is illustrated in FIG. 9 and includes a band 140 having side edges 142 with cut outs that create a recessed edge 144 that is spaced from the tire bead when the band 140 is in the locked position. These recessed edges 144 create portions of the tire beads 100,102 that are not covered by the band 140. These uncovered portions of the tire bead are therefore subjected to air pressure from the pressurized air in the tire, which presses the tire bead against the rim 146. The recessed edges 144 also provide a convenient place to insert tire tools when changing a tire. That is, the recessed edges 144 allow the tire tool to be used to push on the tire 85 from the outside into a recessed edge and lift the tire 85 off the rim 146.

A third embodiment of the present invention is illustrated in FIGS. 10-13. This embodiment is particularly useful on wide rims. The third embodiment includes two bands 150 positioned in the rim trough 152 and spaced from each other. As with the previously-described bands, each band 150 includes two free ends movable relative to each other, and each band 150 is positioned to substantially inhibit movement one of the tire beads 154 away from one of the sidewalls 156 of the rim 158. Each band 150 includes a corresponding tightening mechanism 160 for moving the band 150 between the locked and unlocked positions. Preferably, the two tightening mechanisms 160 are positioned on opposing parts of the wheel so that the rim 158 stays balanced.

Various features and advantages of the invention are set forth in the following claims.

The invention claimed is:

1. A vehicle wheel comprising:
    a wheel rim having a first sidewall and a second sidewall defining a rim trough and an opening extending through a portion of the wheel rim;
    a tire having a tire bead positioned in the rim trough in engagement with the first sidewall; and
    a bead lock positioned in the rim trough adjacent the tire bead,
    wherein the bead lock is movable between a locked position in which the bead lock substantially inhibits movement of the tire bead away from the first sidewall and an unlocked position in which the bead lock permits movement of the tire bead away from the first sidewall,
    wherein the bead lock includes an actuator positioned in the opening and including a portion accessible from outside the wheel rim,
    wherein the bead lock further includes a band positioned in the rim trough and including two free ends movable relative to each other, the band including a side edge engaged with the tire bead, and
    wherein the side edge includes a cut out that creates a recessed edge that is not engaged with the tire bead.

2. A vehicle wheel as claimed in claim 1, wherein the bead lock further comprises a tightening mechanism secured to the two free ends.

3. A vehicle wheel as claimed in claim 2, wherein the tightening mechanism includes a winch and a cable wrapped around the winch and secured to one of the free ends.

4. A vehicle wheel as claimed in claim 3, wherein the winch is coupled for rotation with the actuator.

5. A vehicle wheel as claimed in claim 1, wherein the actuator is mounted for rotation relative to the wheel rim, and wherein the vehicle wheel further includes a seal between the actuator and the wheel rim to inhibit a passage of gas between the actuator and the wheel rim.

6. A vehicle wheel as claimed in claim 1, wherein the actuator comprises:
- a tubular member having a hollow interior; and
- a valve mechanism positioned in the hollow interior to control a passage of gas into and out of an interior volume defined by the tire and the wheel rim.

7. A vehicle wheel adapted to receive a tire having a tire bead, the vehicle wheel comprising:
- a wheel rim having a first sidewall and a second sidewall defining a rim trough and an opening extending through a portion of the wheel rim; and
- a bead lock positioned in the rim trough adjacent the tire bead,
- wherein the bead lock is movable between a locked position and an unlocked position,
- wherein the bead lock includes an actuator capable of moving the bead lock from the unlocked position to the locked position,
- wherein the actuator is at least partially positioned in the opening and includes a portion accessible from outside the wheel rim,
- wherein the bead lock further includes a band positioned in the rim trough and including two free ends movable relative to each other, the band including a side edge engaged with the tire bead, and
- wherein the side edge includes a cut out that creates a recessed edge that is not engaged with the tire bead.

8. A vehicle wheel as claimed in claim 7, wherein the bead lock further comprises a tightening mechanism secured to the two free ends.

9. A vehicle wheel as claimed in claim 8, wherein the tightening mechanism includes a winch and a cable wrapped around the winch and secured to one of the free ends.

10. A vehicle wheel as claimed in claim 9, wherein the winch is coupled for rotation with the actuator.

11. A vehicle wheel as claimed in claim 7, wherein the actuator is mounted for rotation relative to the rim, and wherein the vehicle wheel further includes a seal between the actuator and the wheel rim to inhibit a passage of gas between the actuator and the wheel rim.

12. A vehicle wheel as claimed in claim 7, wherein the actuator comprises:
- a tubular member having a hollow interior; and
- a valve mechanism positioned in the hollow interior to control a passage of gas through the tubular member.

* * * * *